United States Patent [19]
Lee

[11] Patent Number: 4,636,589
[45] Date of Patent: Jan. 13, 1987

[54] IN-LINE TELEPHONE INTERCOM SYSTEM

[75] Inventor: Peter Lee, Monterey Park, Calif.

[73] Assignee: American Phone Products, Anaheim, Calif.

[21] Appl. No.: 697,787

[22] Filed: Feb. 4, 1985

[51] Int. Cl.⁴ .............................................. H04M 1/72
[52] U.S. Cl. ..................................... 379/159; 379/163
[58] Field of Search ............. 179/81 R, 18 AD, 99 R, 179/99 A, 99 H, 99 LS

[56] References Cited

U.S. PATENT DOCUMENTS

| | | | |
|---|---|---|---|
| 4,088,846 | 5/1978 | McEowen | 179/99 H X |
| 4,132,860 | 1/1979 | Rasmussen | 179/81 R X |
| 4,485,273 | 11/1984 | Bartelink | 179/81 R |
| 4,490,583 | 12/1984 | Bednarz et al. | 179/81 R X |

Primary Examiner—James L. Dwyer
Attorney, Agent, or Firm—G. Donald Weber, Jr.

[57] ABSTRACT

An in-line intercom system for use with telephones, in particular, a single line telephone. The intercom system includes an intercom unit, a hold unit and a ring silencing unit. The system is electro-mechanical and is modular so that it can be inserted directly into most existing telephone lines.

14 Claims, 2 Drawing Figures

IN-LINE TELEPHONE INTERCOM SYSTEM

BACKGROUND

1. Field of the Invention

This invention is directed to telephone system accessories, in general, and to intercom systems which are modularly connectable with existing telephone lines, in particular.

2. Prior Art

There are many types of intercom systems on known in the prior art. Some intercom systems are stand alone or separate units with transmitter/receiver units at different locations. The systems often require the use of separate interconnecting lines which must be provided and installed between the separate units. The problems with this type of installation in existing structures is inherently obvious.

There are other intercom systems which are purported to be operable when the respective units are plugged into existing wiring in an existing structure. However, these units have the shortcoming that they must operate on the existing line voltage, will frequently be inoperative when the line voltages are disconnected and require separate and additional units at the respective locations. Moreover, these units frequently are subject to interference, such as 60 Hz hum, on existing household circuitry. In addition, many existing telephone systems in the home or small office include a single line telephone with multiple extensions. It is possible with these extensions to effect an intercom system by merely lifting and speaking through to extension phones or handsets. However, this approach has the distinct disadvantage that the lifting of one or more of these handsets triggers the dial tone which is provided by the central office of the telephone system. In addition, there is no reliable signalling apparatus to assure that the appropriate extension is answered by the appropriate person with whom communication is desired. On the other hand, any attempt to provide reliable signalling will usually grossly encumber the existing system and entail the problems discussed above relative to separate intercom systems.

In other intercom systems which are supplied with existing telephones there is usually a requirement of a separate wiring system for the signalling, such as a buzzer or the like, and the requirement of additional push buttons on the instrument. The provision of separate hold buttons or push buttons on telephone instruments are also considered separately billable items by most telephone companies so that the expense for such items is not only large at the initial installation, but the rental cost is continuous.

Moreover, these systems are usually not exchangeable or easily modified in the case of telephone intercom systems which are included in the existing phone instrument.

SUMMARY OF THE INVENTION

The subject invention is directed to a telephone intercom system which is primarily useful with a single line or two-line telephone which has multiple extension instruments. The intercom system comprises a modular unit which is readily connected to most modular telephone systems and instruments which are available in the current technology. The inventive unit comprises an electronic circuit which is connected into the existing telephone line and operates primarily with the signal produced thereby. A separate power source is provided to operate a signalling and detecting unit. The intercom system does not affect the standard operation of the telephone instrument and/or system. However, the ringing of the existing phone can be inhibited. The inventive unit provides an electronic Hold for the system so that an outside call can be placed on Hold. The Hold can be released automatically by lifting the handset of any extension telephone. The unit also includes an intercom feature which permits intercom operation between two or more telephone extensions without triggering the dial tone so that an interference-free communication can be effected for as long as desired.

DESCRIPTION OF A PREFERRED

Figure 1:
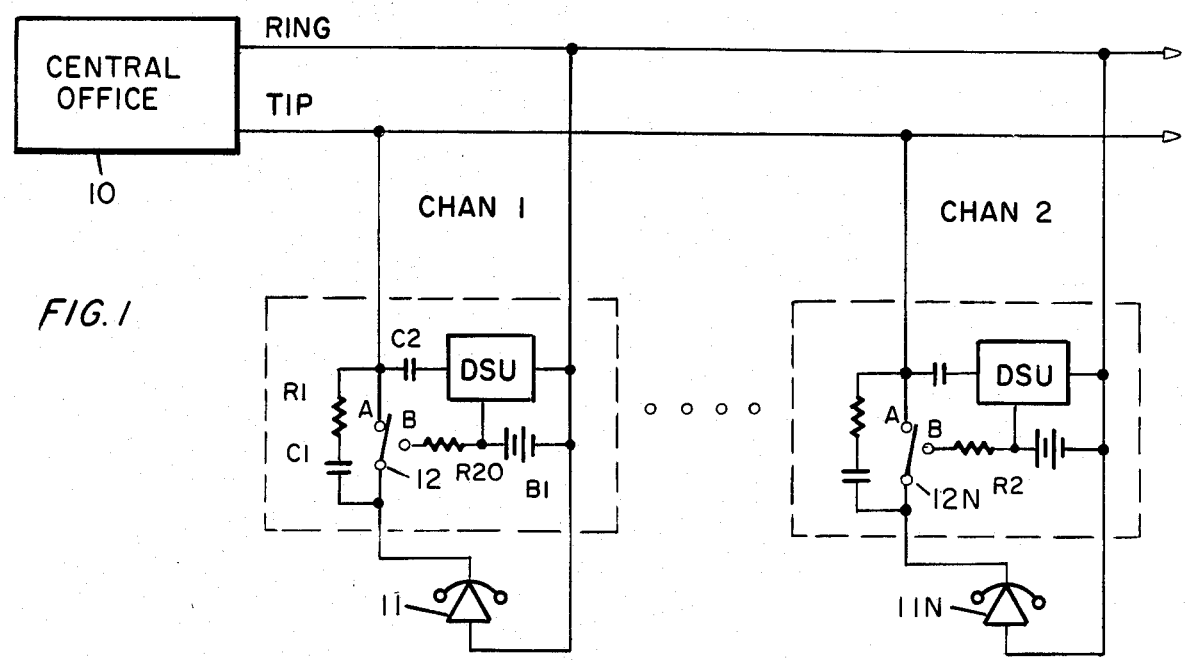
FIG. 1 is a schematic representation of an existing telephone system as it relates to a/central office with a schematic representation of the instant invention.

Referring now to FIG. 1, there is shown a schematic representation of existing telephone systems. This system includes the central office 10 which, by definition, includes all of the telephone company equipment and operations. The details of this installation are beyond the scope of this description. However, the central office of virtually any known telephone system includes appropriate telephone lines which are normally referred to as the TIP and RING lines. In the ordinary circumstances, the TIP line is considered to be the signal line while the RING line is considered to be the common line. This may be considered to be the low voltage, ground, or common line.

Connected to the telephone lines are a plurality of channels which can be considered to be separate telephone instruments and the appropriate lines associated therewith. For convenience, the channels are referred to as channel 1 and channel N. In this case, N can be any integral number but is typically on the order of two or three. These channels are considered to be extensions of a single telephone line, for example in a single house or office.

Each of the channels is identical in that it consists of a conductor connected to the TIP line and a conductor connected to the RING line and a telephone instrument 11 (through 11N) which is connected to these lines. The telephone instrument 11 is of a typical configuration which requires the TIP and RING lines.

In the example shown, the RING line is connected directly to the telephone instrument 11 while the TIP line is connected via switch 12 which can be selectively arranged to make a connection with the TIP line or to a resistor R2O which is connected in series with a suitable source B1 which is shown, in this case, as a battery. In a typical arrangement as described hereinafter, source B1 is a 9 volt battery. A series connection of a capacitor C1 and a resistor R1 are connected across switch 12 so as to form a "permanent" AC coupling between the telephone instrument 11 and the TIP line. Also connected substantially in parallel with phone instrument 11 and across the TIP and RING lines is the series circuit comprising capacitor C2 and the detector and signalling unit DSU. All of these individual components, with the exception of the phone instrument 11, comprise the intercom system of the instant invention and are referred to as the intercom unit 100 and are enclosed within the dashed outline for convenience.

As noted above, each of the channels is substantially identical wherein a description of each of the channels is not deemed necessary.

In operation, the telephone instrument 11 is standard and operates in the typical fashion. The central office is not affected by the instant invention and operates to provide the telephone signals and operations along the lines in the normal fashion.

Thus, with switch 12 closed, i.e. connected to terminal A, the telphone instrument 11 will operate to receive phone calls from the central office along the TIP and RING lines. However, with switch 12 in the other condition, i.e. connected to terminal B, the phone instrument 11 is connected to receive power from battery B1. However, because of the RC network comprising resistor R1 and capacitor C1, the phone instrument is still connected through an AC coupling to the TIP and RING lines throughout the entire system, including instrument 11N in channel N (and associated extensions on the same line). Consequently, by activating the detect and signalling unit DSU (as described hereinafter) an indication is made at extension 11N. This extension instrument can then be picked up and operated, as well. A complete circuit now exists between instrument 11 and instrument 11N through the common TIP and RING lines.

It should be noted that in operating instrument 11N, the appropriate switch 12N is also placed in the intercom position, i.e. connected to terminal B. Thus, instruments 11 and 11N can "talk to each other" along the common TIP and RING lines and through the AC coupling networks provided by the respective RC networks R1 and C1.

It will be seen that with this connection, the instruments 11 and 11N are AC coupled to the TIP and RING lines and battery B1 provides electrical power. Thus, no additional DC load or power is applied across the TIP and RING line provided by the central office 10. Consequently, the dial tone which is normally generated from the central office is not triggered and, therefore, is not applied to the TIP and RING lines herein involved.

The RC circuit comprising resistor R1 and capacitor C1 also serves the purpose of suppressing arcing problems across switch 12. That is, the central office 10 may be considered to include large inductive elements. When the circuit associated therewith is broken by opening switch 12, a large back EMF spike pulse may appear across the terminals of the switch and cause arcing. The RC circuit avoids this problem.

In similar fashion, the RC circuit also permits the central office to remain in contact with the instrument even when it is placed in the intercom mode by operation of switch 12. Thus, insofar as the central office 10 is concerned, the circuitry involved herein is substantially transparent in terms of access to the existing telephone instrument.

As shown schematically in FIG. 1, the detection and signalling unit DSU is connected across the TIP and RING line in series with capacitor C2. As will be discussed in detail hereinafter, the DSU provides appropriate signalling through capacitor C2 across the interconnect lines, including the TIP and RING lines, to an adjacent channel. The DSU in this channel detects the signal provided across the lines and causes a suitable indication such as a buzz, beep, ring or the like. Through this indication, it becomes obvious that an intercom call has been placed and that this instrument should be utilized.

As noted, the power for this device is provided by the 9 volt battery B1. This is advantageous in that the battery is referenced to the RING line wherein the battery, the intercom circuit, the central office lines and so forth are all referenced at the same potential. This reference potential is the potential supplied along the RING line.

Moreover, use of a suitable power supply including an external transformer and the like, to provide a DC signal based upon the commercial AC power may provide problems with different types of groundings (i.e. reference signals). Also, the 60 Hz hum may be injected into the line. Moreover, with this arrangement there is no interference with the AC signals provided by the central office.

Figure 2:
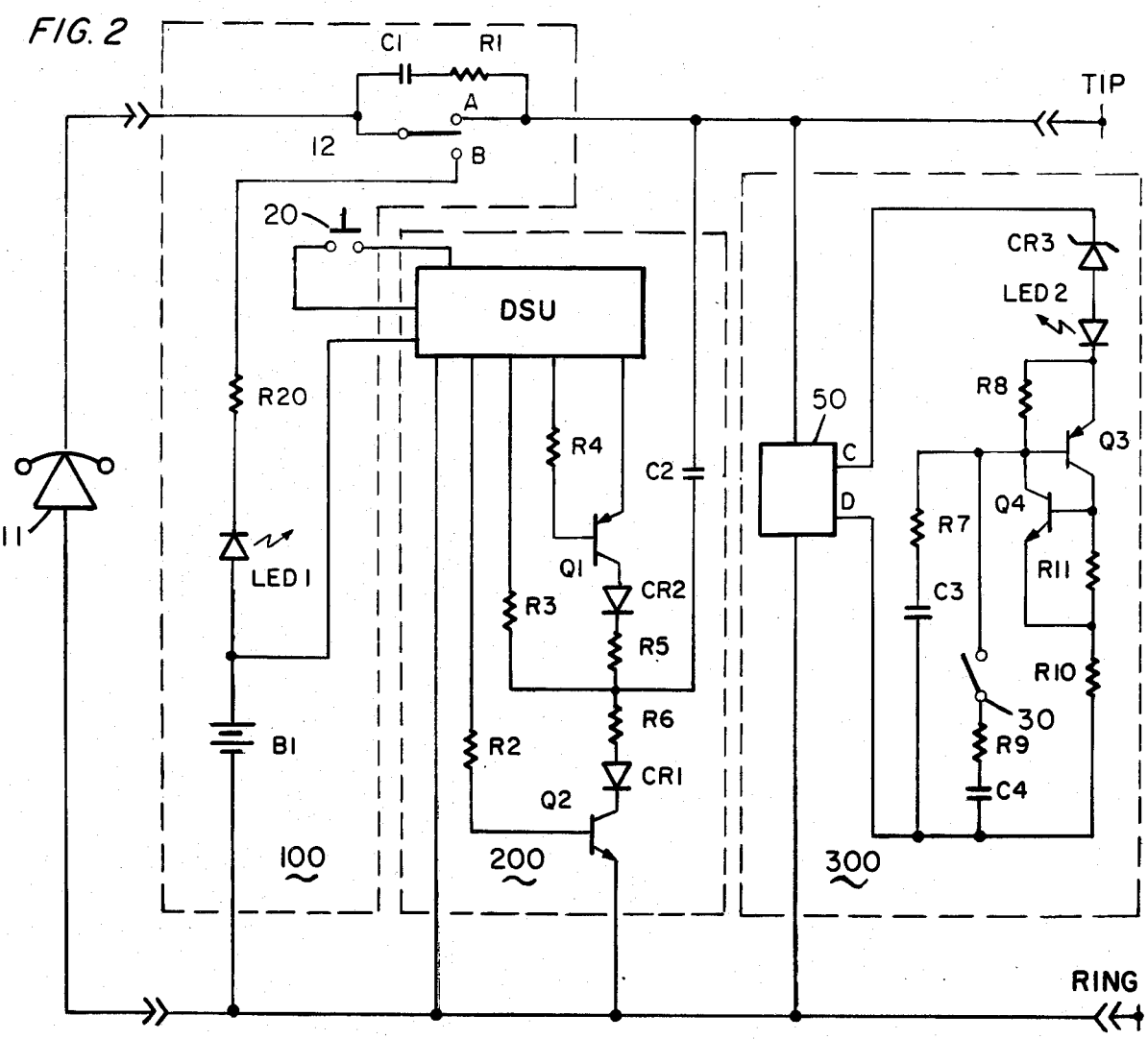
FIG. 2 is a schematic diagram of a preferred embodiment of the circuitry of the instant invention.

Referring now to FIG. 2, there is shown a more detailed schematic diagram of the circuit which forms the instant invention. Components which are similar to those shown in FIG. 1 bear similar reference numerals.

Thus, extension phone instrument 11 is connected to the TIP and RING lines as before which lines are connected to the central office 1O (not shown in FIG. 2). In particular, the instrument is connected to the TIP line via switch 12 and the series RC circuit comprising capacitor C1 and resistor R1 which is connected in parallel with switch 12.

In like fashion, the battery B1 and resistor R20 are shown connected in series between the RING line and the B (or intercom) terminal of switch 12. In the embodiment shown in FIG. 2, a light emitting diode LED 1 is connected in series with battery B1 and resistor R20. This LED is an optional feature which can be omitted in some embodiments. However, in the arrangement shown in FIG. 2, the LED 1 is rendered operative when switch 12 is placed in the intercom position. Operation of LED 1 is indicative of the intercom mode of operation by the appropriate instrument.

It should also be noted that by placing switch 12 in the intercom position, i.e. at terminal B, the instrument 11 can be effectively turned off or silenced. That is, the ringing signal across the TIP and RING lines is typically a 115 volt AC, 20 Hz signal. Inasmuch as switch 12 interrupts the direct line, the RING signal must now pass through the R1, C1 tank circuit. However, capacitor C1 is selected so that the 20 Hz signal (a relatively low level signal) is significantly blocked or attenuated by the RC circuit. Also, the circuit path comprising battery B1, resistor R2O and LED 1 further reduces the RING signal. Thus, the RING signal which is applied is not sufficient to operate the ringing mechanism of telephone 11.

Also shown in FIG. 2 is the detector and signalling unit DSU which is connected to the TIP line via capacitor C2. In more detail, the output circuits of the detecting and signalling unit comprise transistor Q2, diode CR2, resistor R5, resistor R6, diode CR1 and transistor Q1. The base of transistor Q2 is connected to the DSU via resistor R2 while the base of the transistor Q1 is connected to the DSU via resistor R4. Resistor R3 connects the DSU to the junction between resistors R5 and R6 and one side of capacitor C2. The other side of capacitor C2 is returned to the TIP line. In addition, the battery B1 is connected to provide power to the DSU and switch 20 (the CALL switch) is connected to selectively activate the DSU.

In operation, switch 20 which is a momentary switch, is closed to activate the DSU. This turns on the driver circuit comprising transistors Q1 and Q2. It should be noted that in the non-operative or off condition, these transistors represent a high impedance driver circuit which provides virtually no load to the telephone system. When operated, the DSU is arranged to produce an AC signal (referred to as the CALL signal) which is passed across capacitor C2. It should be noted that the frequency selected for the CALL signal is outside the typical voice band, i.e. 300 Hz to 3 KHz. In this fashion, the CALL circuit on extension units will not be activated by a voice signal. Moreover, this frequency is outside the frequency band of the signals produced by operation of push button telephones.

As noted above, the call signal is generated by the DSU and transferred across capacitor C2 to the TIP line. This frequency signal then is transmitted along the TIP line to other extensions in the local (internal) phone system. The DSU in the other extension instruments receives the signal along the TIP line and across the respective capacitor C2 and resistor R3. This signal causes the DSU to produce a suitable indication, i.e. a beep or buzz signal. Thus, the receiving unit is activated to summon a call recipient to the instrument associated with that intercom circuit. At the receiving phone, the switch 12 is placed in the intercom position (terminal B), the handset lifted and a circuit between the two instruments is provided along the common TIP and RING lines. However, as noted above, no significant load is detected at the central office wherein the dial tone is not generated. Thus, interference free communication can be had between the two instruments.

It should be noted that the DSU includes circuitry in the nature of a "one-shot" circuit. Thus, irrespective of the duration of closure of switch 20, DSU produces an indicating signal for only about 0.8 seconds maximum. A shorter duration closure of the switch 20 will result in a shorter indication by DSU.

This arrangement has the advantage that the buzzer or indicator does not continue to operate causing interference with the communication between instruments and, does not produce a drain on battery B1.

The electronic HOLD portion of the circuit includes a diode bridge circuit 50 connected across the TIP and RING lines. The bridge circuit is provided inasmuch a the polarities of the voltages could become reversed. The diode bridge acts as a polarity guard and assures that the signals at terminal C are positive with respect to terminal C at any time.

The remainder of the circuit is in the nature of a silicon controlled rectifier or latch circuit. Normally, this circuit is off and produces an extremely high impedance thereby not loading down the signal provided across the telephone lines. It should be noted that in the inoperative condition of the telephone instrument, the voltage across the diode bridge is approximately 48 volts. Conversely, when the telephone instrument is operative, i.e. the handset has been lifted, a voltage of approximately 8 volts exists across the diode bridge. This voltage difference is utilized advantageously by this circuit. That is, the Hold switch 30 has little or no effect when instrument 11 is inoperative. That is, a 48 volt difference exists across the diode bridge and is placed across the "SCR" circuitry which, effectively, remains turned off. However, when instrument 11 is in operation, an 8 volt signal appears across the diode bridge and across the SCR circuit. When switch 30 is activated, the base electrode of transistor Q3 is connected to the low voltage side of the diode bridge via resistor R9 and capacitor C4. However, because zener diode CR3 has approximately a 12 volt reverse bias drop, the circuit is not affected. Conversely, when the telephone instrument 11 is deactivated while Hold switch 30 is closed, the voltage across terminals C and D suddenly rises toward 48 volts. When this voltage rises to a sufficient level (approximately 18 volts), it causes DC current flow through the zener diode CR3, through LED 2 and through the base emitter junction of transistor Q3. When transistor Q3 is turned on, a relatively positive voltage is supplied to the base of transistor Q4 which is also turned on. With transistor Q4 turned on, the base electrode of transistor Q3 is, effectively, connected to the low voltage side of diode bridge 50. The circuit tends to remain in this condition irrespective of the condition of hold switch 30 and the voltage across terminals C and D stabilizes at 18 volts. The DC current through the zener diode CR3 is sufficient to keep the central office equipment in the active state (operative). However, when a further extension phone instrument (or the original phone instrument) is picked up or operated again, the voltage across the diode bridge again drops to 8 volts. This voltage level is far below the zener voltage required by zener diode CR3. Consequently, the current therethrough terminates which effectively terminates the current path including transistors Q3 and Q4. When these transistors are turned off, the electronic Hold circuit operation terminates and the system reverts back to the original condition. Thus, the Hold condition is automatically released whenever a phone instrument is picked up.

In the electronic Hold circuit, resistors R10 and R11 are a voltage divider network wherein resistor R11 is the base transistor resistor which prevents accidental turn on due to leakage current. Resistor R10 is a load resistor which limits the amount of current which can pas through transistor Q3 due to signals from the central office. Resistor R9 provides the connection between transistor Q3 and the low voltage line while providing current limiting as well. Resistor R7 and capacitor C3 are used to provide sufficient charge at the base of transistor Q3 so that a momentary open in the telephone lines (TIP and RING) will not turn off the hold system. This is a type of sustaining circuit for the regenerative action of the SCR circuit and is important in those instances where the phone system is used in a "call waiting" feature which is offered by several telephone companies. That is, with the call waiting feature, the phone company indicates that a second call is coming on the line by applying "clicking noises" in the handset of the instrument which is already in use. The clicking sounds are provided by momentary interruptions of current from the central office. These momentary interruptions could normally defeat the Hold feature of this circuit. Thus, the RC circuit comprising resistor R7 and capacitor C3 is provided to avoid this momentary disconnection and an inadvertent termination of a HOLD situation on the existing system.

In summary, the circuit of the instant invention is capable of several major operating modes. In the normal telephone mode, switch 12 is connected to terminal A and the telephone system functions in the normal fashion. In this arrangement, transistors Q1, Q2, Q3, Q4 as well as zener diode CR3 and the LED's are all turned off. The impedance presented to the telephone lines is very high and is, in fact, the impedance of the existing telephone instrument. More importantly, this circuit does not provide any significant loading to the voice band signal, the dial tones and/or the ringing signal in existing telephone systems.

In the INTERCOM mode, switch 12 is connected to terminal B concurrent with the operation of the CALL switch 20. Operation of switch 20 causes the DSU to produce the indicator signal, typically a tone, to be placed on the telephone line via the output driver circuit which includes transistors Q1 and Q2, diodes CR1 and CR2, and resistors R5 and R6. The signal is supplied to the TIP and RING lines via the AC coupling capacitor C2. The tone is received in the reverse fashion at the DSU of the other intercom units which are connected on the same telephone lines. These DSU's provide the momentary intercom signal at the receiving unit. Switch 12 is now placed in the intercom position at terminal B and the receiving telephone handset is picked up and used. When this intercom communication is terminated, the calling and receiving phone instruments are, typically, replaced to the cradle or inoperative position and the switches 12 are returned to the normal position at switch terminal A.

In the HOLD mode, the Hold button 30 is activated concurrent with the placing of the handset back on the cradle of an active telephone instrument. This concurrent action couples a pulse signal to the base of transistor Q3 via the RC network comprising resistor R9 and capacitor C4 to turn on transistors Q3 and Q4 to form a bistable logic circuit which remains latched in the "on" condition until the DC current through both transistors is interrupted. The LED 2 turns on to indicate that a call is on Hold. When an appropriate telephone handset is picked up or activated, at any extension, the DC voltage across the telephone lines will be reduced which in turn will drop the voltage below the threshhold of zener diode CR3 and, thus, interrupt the current through transistors Q3 and Q4 wherein the Hold mode is released.

In the SILENCING mode, the intercom switch 12 is placed in the intercom position, i.e. connected to terminal B. This, effectively, prevents the telephone from ringing because of the network comprising capacitor C1, resistor R1, diode LED 1 and battery B1 effectively attenuates the incoming ringing voltage and prevents the telephone from ringing. However, the ringing current does pass through LED 1 and causes it to blink with the ringing signal.

Thus, there is shown and described a unique modular intercom system which can be used with virtually any existing single-line or two-line telephone systems without altering the existing telephone wiring. This intercom unit does not interfere in any way with the existing systems either internal or external of the immediate telephone system. In the embodiment shown and described specific devices and components have been described as well as the interconnection thereof. It should be understood that those skilled in the art may conceive of modifications or changes to the circuit configuration as shown and described. For example, additional options such as further LED's, ringing, buzzing or the like can be included. Moreover, this modular design can be incorporated into the housing of an existing telephone instrument, if so desired. However, any such modifications or changes which fall with the purview of the instant description are intended to be included therein as well. The embodiment which is shown and described is intended to be illustrative only and is not intended to be limitative of the invention. Rather, the invention is limited only by the scope of the claims appended hereto.

I claim:

1. A telephone control system for use with an existing single line, two-conductor telephone line system including Tip and Ring lines comprising,
   interconnecting means for connecting a telephone instrument to said telephone line system,
   detection and signalling apparatus (DSA) connected between said Tip and Ring lines and to said interconnection means to selectively detect or supply a control signal along said telephone line system via said interconnecting means,
   source means connected to said interconnection means and to said DSA in order to supply power thereto,
   said interconnection means includes first switch means connected in series between said telephone instrument and the Tip line of said telephone line system,
   said interconnection means further includes an RC circuit connected across said first switch means to provide a continuous circuit path from said Tip line to said telephone instrument which exhibits high impedance to low frequency signals supplied to said interconnection means via said telephone line system, and
   a hold circuit connected to said interconnection means in order to maintain a call condition at said telephone line system relative to said telephone instrument.

2. The system recited in claim 1 wherein,
   said detection and signalling apparatus (DSA) includes a detection and signalling unit (DSU) for detecting and supplying high frequency signals to produce an audio signal,
   second switch means connected to said DSU to control the operation of supplying said high frequency signals.

3. The system recited in claim 1 including,
   signal producing means connected to said interconnection means to selectively indicate the mode of operation of the system as determined by said interconnection means.

4. The system recited in claim 2 including,
   driver circuit means connected to said DSU to supply said high frequency signals to said telephone line system when operative and to provide a high impedance circuit when inoperative in order to produce little or no load on said telephone line system.

5. The system recited in claim 1 including,
   third switch means for selectively activating said hold circuit.

6. The system recited in claim 5 including,
   latch circuit means connected to said interconnection means to store a voltage condition which represents said call condition.

7. The system recited in claim 6 including,
   bridge means connected across said telephone line system to supply voltage signals of a prescribed polarity to said latch circuit means.

8. The system recited in claim 7 including,
   signalling means connected to said latch circuit means in order to produce a signal representative of the operating status of said latch circuit means.

9. A telephone control circuit for use with an existing telephone instrument and a telephone system including Tip and Ring telephone lines,
- connecting means for connecting said Tip and Ring telephone lines to said telephone instrument,
- signalling means connected to said Tip and Ring telephone lines to selectively send and receive relatively high frequency signals through said Tip and Ring telephone lines,
- hold circuit means connected to said Tip and Ring telephone lines and to said connecting means in order to selectively maintain a signal condition at said telephone instrument,
- source means,
- switch means adapted to be alternatively connected in parallel with said connecting means or connected between said source means and said telephone instrument,
- indicator means connected in series with said switch means and said source means such that said indicator means is selectively activated by said switch means, and
- signal polarity means connected across said telephone lines to receive the signal thereon and convert said signal to a unipolar signal which is supplied to said hold circuit.

10. The circuit recited in claim 9 including,
- further switch means connected to said signalling means to cause said signalling means to produce and send said relatively high frequency signals through said telephone lines.

11. The circuit recited in claim 10 including,
- driver circuit means connected to said Tip and Ring telephone lines and to said signalling means to control said high frequency signals which are applied to said Tip and Ring telephone lines by said signalling means.

12. The circuit recited in claim 10 wherein,
- third switch means,
- said hold circuit includes a latch circuit which is only operated when said third switch means is activated.

13. The circuit recited in claim 9 wherein,
- said indicator means comprises first light emitting means.

14. The circuit recited in claim 12 including,
- further indicating means connected to said latch means for indicating the status of said latch means.

* * * * *